Patented Oct. 14, 1924.

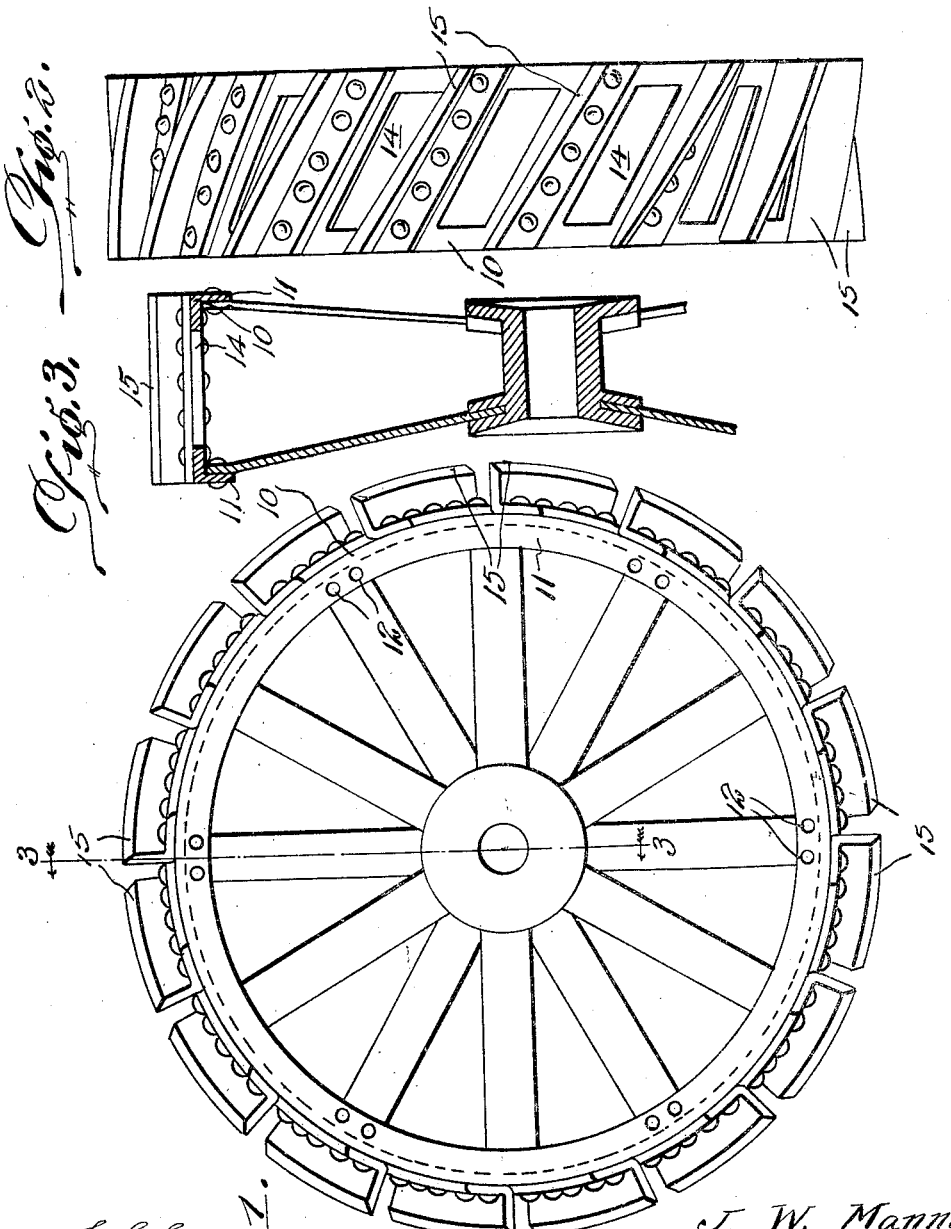

1,511,294

UNITED STATES PATENT OFFICE.

JAMES W. MANNING, OF SAGINAW, MICHIGAN.

TRACTOR WHEEL.

Application filed September 29, 1922. Serial No. 591,366.

*To all whom it may concern:*

Be it known that I, JAMES W. MANNING, a citizen of the United States, residing at Saginaw, in the county of Saginaw and State of Michigan, have invented new and useful Improvements in Tractor Wheels, of which the following is a specification.

This invention relates to tractor wheels and has for its primary object the provision of a rim designed to increase the traction, by preventing slipping of the wheel under all conditions, and also to mulch the soil, the ability of the rim, when associated with the wheel to travel over freshly plowed ground with ease, being one of its chief characteristics.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a side elevation of the rim forming the subject matter of the invention.

Figure 2 is a view taken at a right angle to Figure 1.

Figure 3 is a partial cross sectional view showing the application of the rim.

The wheel rim forming the subject matter of the present invention is indicated by the reference numeral 10 and is adapted to be formed in different sizes. Integrally formed at the opposite sides of the rim 10 are inwardly directed annular flanges 11 which are designed to receive the spokes of the wheel when the rim is secured to the latter and as shown in Figure 3 of the drawings. The flanges 11 are provided with openings arranged in pairs to accommodate fastening elements which are used to secure the rim in its entirety to the spokes. The periphery of the rim 10 is provided with a plurality of spaced diagonally disposed elongated slots 14 which cooperate with substantially L-shaped in cross section lugs 15 secured to the rim in a manner to increase the traction and to assist in mulching the soil and these substantially L-shaped lugs are secured to the rim through the medium of five spaced rivets 15'. The outer portions of the lugs are bevelled so that they may readily obtain an effective purchase upon the ground or surface upon which they are designed to travel. The lugs 15 are of a greater length than the width of the rim and arranged alternatively with respect to the slots for the purpose mentioned. The soil passes through the slots when the rim is in use, which renders the rim particularly advantageous to prevent slipping and skidding and to allow the wheel to readily travel over freshly plowed ground.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

In a tractor wheel, a one piece rim therefor of considerable width and provided with equi-distantly spaced elongated slots arranged diagonally with respect to sides of the rim, inwardly directed flanges forming part of said rim and projecting from the opposite edges of the periphery thereof, said flanges being provided with openings arranged in pairs and adapted to secure said rim to the spokes of the wheel, a plurality of substantially cross sectional L-shaped cleats secured to the rim through the medium of five rivets passing through each inner portion of the cleat and the rim respectively and said cleats being alternatively arranged with the openings, and each of said cleats being of greater length than the width of the rim and extending beyond the ends of the slots as and for the purpose specified.

In testimony whereof I affix my signature.

JAMES W. MANNING.